(12) United States Patent
Harding et al.

(10) Patent No.: US 7,905,971 B2
(45) Date of Patent: *Mar. 15, 2011

(54) WIDE ULTRA HIGH MOLECULAR WEIGHT POLYETHYLENE SHEET AND METHOD OF MANUFACTURE

(75) Inventors: Kenneth C. Harding, Midlothian, VA (US); Gene C. Weedon, Richmond, VA (US); Lisa Owen, Monroe, NC (US)

(73) Assignee: BAE Systems Tensylon H.P. M. Inc.

( * ) Notice: Subject to any disclaimer, the term of this patent is extended or adjusted under 35 U.S.C. 154(b) by 0 days.

This patent is subject to a terminal disclaimer.

(21) Appl. No.: 12/589,148

(22) Filed: Oct. 19, 2009

(65) Prior Publication Data

US 2010/0092729 A1    Apr. 15, 2010

Related U.S. Application Data

(62) Division of application No. 11/787,094, filed on Apr. 13, 2007.

(51) Int. Cl.
*B29C 65/00* (2006.01)
*B32B 37/10* (2006.01)
*B32B 37/22* (2006.01)

(52) U.S. Cl. .................... 156/164; 139/383 R; 156/194; 156/304.6; 428/107; 428/156; 428/213; 428/364; 429/144

(58) Field of Classification Search .................. 428/156, 428/107, 213, 364; 139/383; 156/194, 304.6; 429/144
See application file for complete search history.

(56) References Cited

U.S. PATENT DOCUMENTS

| 4,879,076 | A | 11/1989 | Sano et al. | |
| 4,931,126 | A * | 6/1990 | McCarville et al. | 156/304.6 |
| 5,091,133 | A | 2/1992 | Kobayashi et al. | |
| 5,106,555 | A | 4/1992 | Kobayashi et al. | |
| 5,106,558 | A | 4/1992 | Kobayashi et al. | |
| 5,578,373 | A | 11/1996 | Kobayashi et al. | |
| 6,951,685 | B1 * | 10/2005 | Weedon et al. | 428/364 |
| 2005/0031943 | A1 * | 2/2005 | Call | 429/144 |

FOREIGN PATENT DOCUMENTS

EP    1 627 719 A1    2/2006

* cited by examiner

*Primary Examiner* — Brent T O'Hern

(57) ABSTRACT

A wide sheet of highly oriented ultra high molecular weight polyethylene comprising a plurality of strips of highly oriented ultra high molecular weight polyethylene partially overlapped or abutted longitudinally to define joints between adjoining strips wherein the thickness of the joint is less than about 80% of the thickness of the sum of the thicknesses of the adjoining strips that make up the joint. A continuous method for the production of such materials comprising subjecting longitudinally overlapping or abutted strips of these materials to temperatures below the melting point of the UHMWPE and pressures over 300 pli is also disclosed.

3 Claims, 5 Drawing Sheets

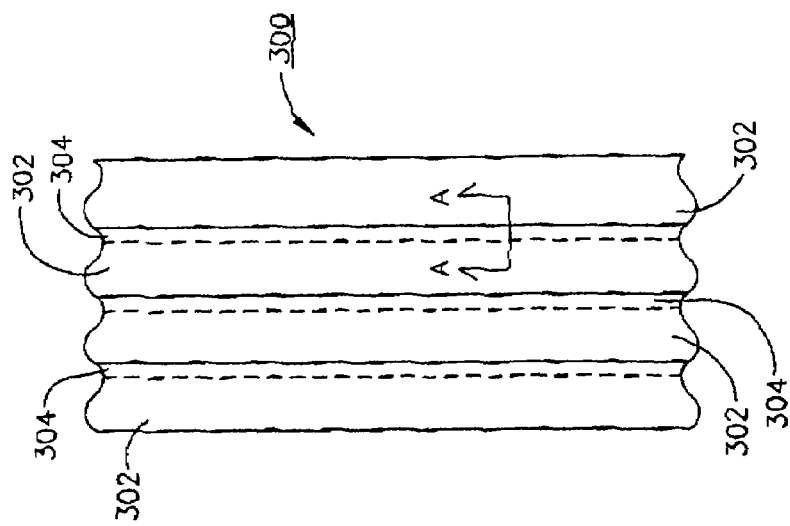
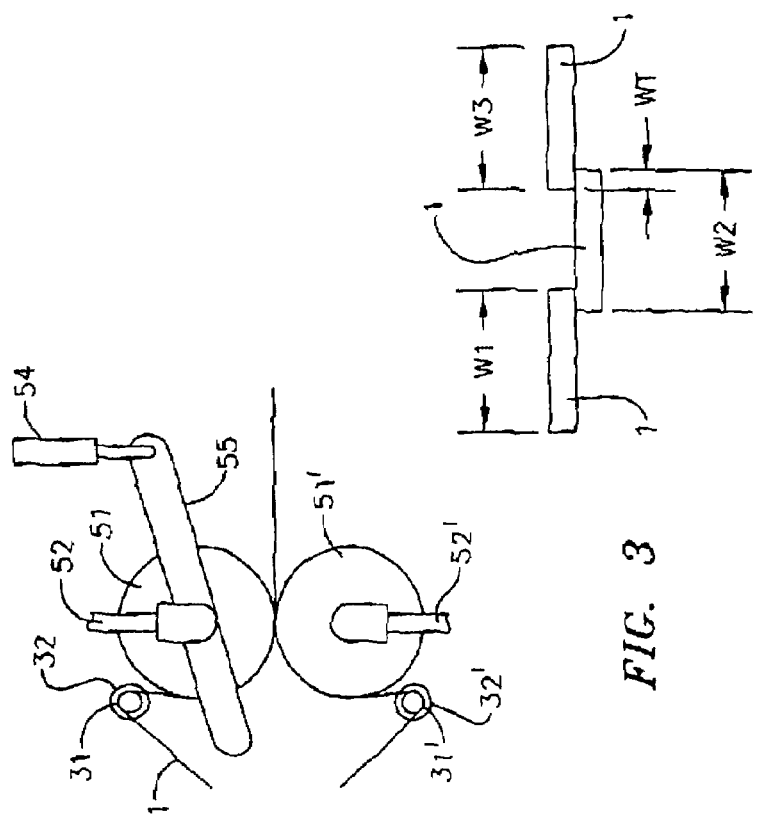
FIG. 3
FIG. 4
FIG. 7 ial pure" refers to sheet material in accordance with

WIDE ULTRA HIGH MOLECULAR WEIGHT POLYETHYLENE SHEET AND METHOD OF MANUFACTURE

This application is a Division of U.S. patent application Ser. No. 11/787,094 filed Apr. 13, 2007 and co-pending herewith.

FIELD OF THE INVENTION

The present invention relates to ultra high molecular weight polyethylene materials and more particularly to a method for the production of wide sheet comprising such materials and the sheet products produced by this method.

BACKGROUND OF THE INVENTION

U.S. Pat. No. 6,951,685 issued Oct. 4, 2005 describes a method for the manufacture of ultra high molecular weight polyethylene (UHMWPE) materials in the form of slit film fibers, tapes and narrow sheets. Such materials are described as having, among other useful properties ballistic resistance of a very high order.

As is apparent to the skilled artisan, the equipment and processing techniques described in this patent require significant capital investment and the application of relatively stringent processing conditions. Both of these requirements increase virtually exponentially as the UHMWPE product width is increased from a fiber to a tape and upwards to a sheet. Thus, in order to contain the additional cost of equipment required to make such wider materials, i.e. sheet as defined herein, it would be desirable to have a method for their manufacture that minimizes such costs and process control requirements.

U.S. Pat. No. 4,931,126 describes an apparatus for increasing the width of a fiber reinforced thermoplastic sheet or tape product, which apparatus increases such width by longitudinally joining parallel sheets or tapes of the fiber reinforced thermoplastic material in an overlap or butt configuration and melting the overlapping or abutting areas of the parallel tapes.

European Patent Publication No. EP 1 627 719 A1 describes a multilayered UHMWPE material comprising a plurality of "monolayers" of UHMWPE in the absence of any adhesive wherein the each monolayer is laid at an angle to any adjacent monolayer. The term "monolayer" as used in this publication is defined as comprising "a plurality of highstrength unidirectional polyethylene strips, oriented in parallel in one plane, next to one another". According to one embodiment the strips partially overlap. The "monolayers" are formed by subjecting the overlying strips to conditions of temperature and pressure in the ranges of 110-150° C. and 10-100 N/cm² These conditions produce a "sheet" having joint areas that are inadequate to maintain even a modicum of integrity and their properties are grossly inferior to those of the sheets of the present invention, as will be demonstrated in the discussion and examples that follow.

There thus remains a need for a method of producing wide strips or sheets of substantially pure and highly oriented UHMWPE from narrower tapes or strips of these materials, and for the products produced by such a method.

OBJECTS OF THE INVENTION

It is therefore an object of the present invention to provide a method for the production of wide sheets of any custom width from narrow strips or tapes of substantially pure and highly oriented UHMWPE, which wide sheets exhibit properties equal or superior to those of the parent strip materials from which the wide sheets were fabricated.

It is another object of the present invention to provide a wide sheet of substantially pure and highly oriented UHMWPE, which wide sheets exhibit strength and modulus properties equal or superior to those of the parent strip materials from which the wide sheets were fabricated.

DESCRIPTION OF THE DRAWINGS

FIG. 3 is a schematic side view of the calendar roll stand portion of the apparatus useful in the fabrication of the wide sheet ballistic materials described herein.

FIG. 4 is a schematic partial top view of a portion of the initial and final alignment guide zones of the apparatus useful in the fabrication of the wide sheet ballistic materials described herein.

FIG. 7 is a partially phantom top plan view of the UHMWPE wide sheet of the present invention prior to processing in accordance with the method of the present invention.

SUMMARY OF THE INVENTION

According to the present invention there is provided a wide sheet of highly oriented ultra high molecular weight polyethylene comprising a plurality of strips of highly oriented ultra high molecular weight polyethylene of indeterminate length abutting or partially overlapped longitudinally to define joints between adjoining strips and wherein the thickness of the joint is less than about 80% of the thickness of the sum of the thicknesses of the adjoining strips that make up the joint. A continuous method for the production of such materials comprising subjecting longitudinally overlapping strips of these materials to temperatures below the melting point of the UHMWPE and pressures over 300 pli as well as the apparatus useful in the process of the present invention are also disclosed.

DETAILED DESCRIPTION

As used herein, the terms "substantially flat", "essentially flat" and "substantially pure" are meant and intended to have the following meanings: "substantially flat" refers to sheet material in accordance with the present invention wherein a joint between two adjoining strips of material has a thickness that is not greater than 80% of the combined thicknesses of the adjoining/overlapping/abutting strips; "essentially flat" refers to sheet material in accordance with the present invention wherein a joint between two adjoining strips is essentially the same thickness as that of the strips being joined with little if any thickness difference therebetween; and "substantially pure" refers to UHMWPE that contains no foreign materials or substances that negatively affect the properties of the UHMWPE except as artifacts of the UHMWPE production process such as catalysts, etc.

The starting material UHMWPE strips of the present invention are those prepared in accordance with the methods described in the following U.S. Pat. Nos. 6,951,685; 4,879,076; 5,091,133; 5,106,555; 5,106,558; and 5,578,373 the teachings of which are all incorporated herein by reference in their entireties. Particularly preferred as the starting materials in the process described herein are the UHMWPE materials prepared as described in the aforementioned U.S. Pat. No. 6,951,685. Such material comprise highly oriented UHMWPE of high purity.

Figure 1:
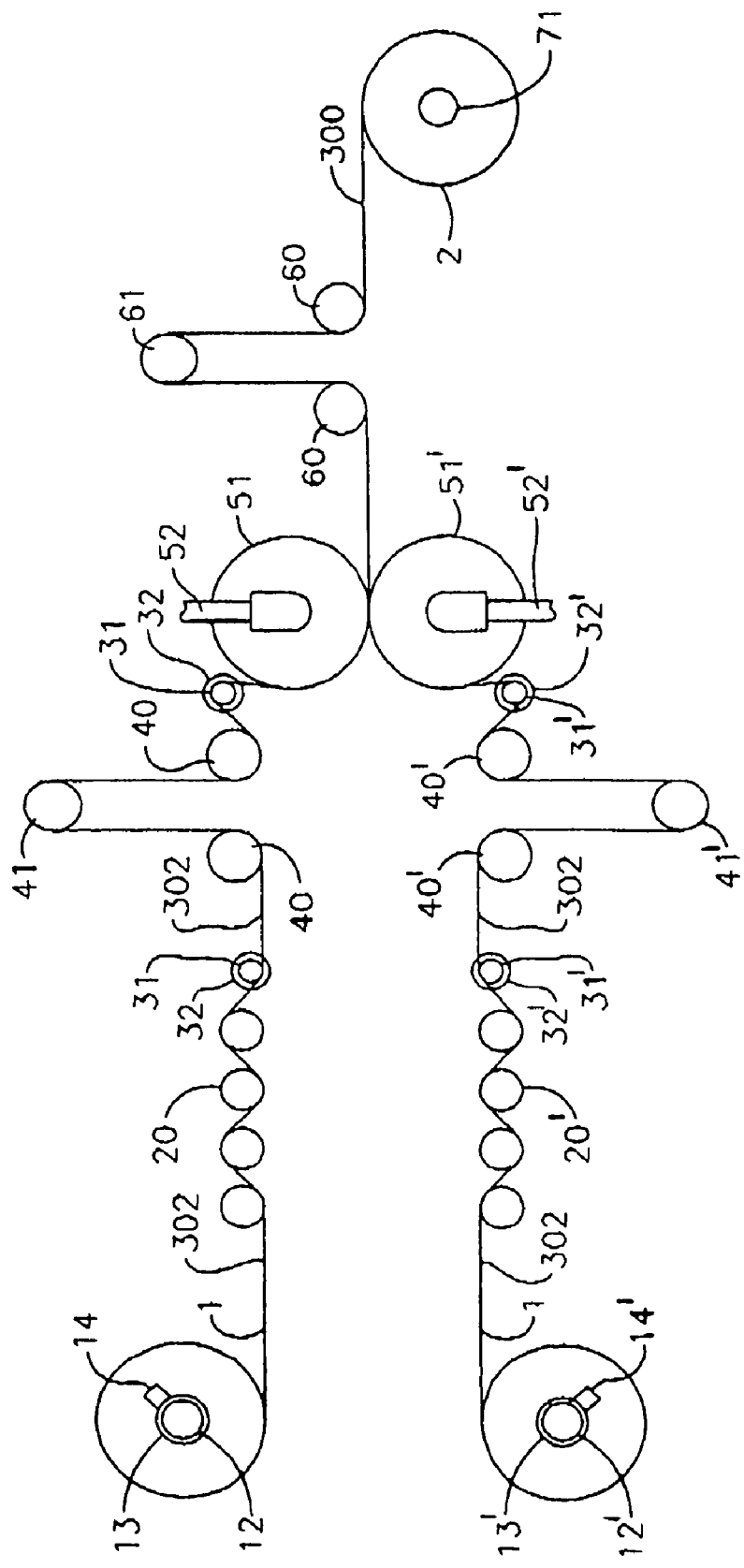
FIG. 1 is a schematic side view of the apparatus useful in the fabrication of the wide sheet ballistic materials described herein.
Figure 2:
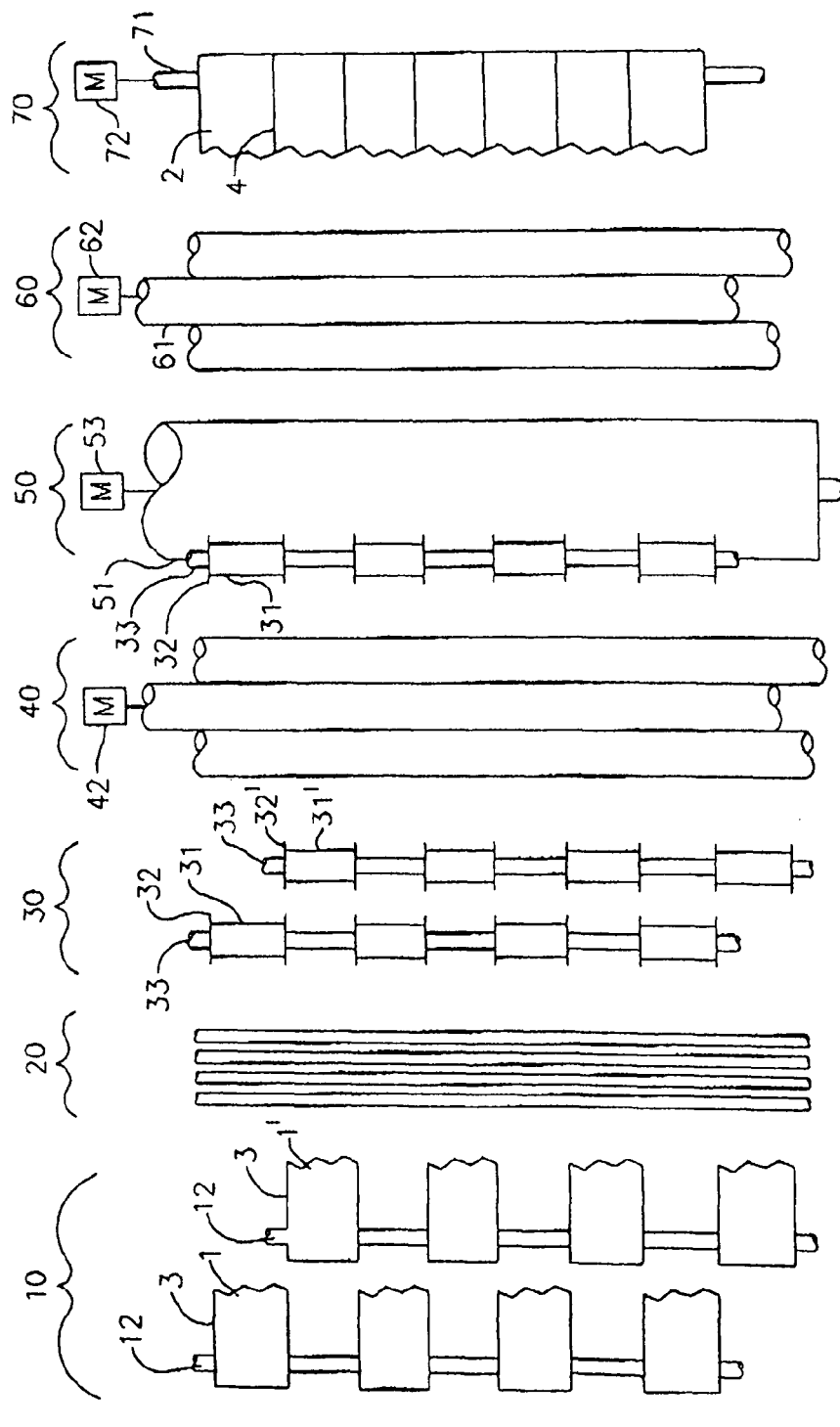
FIG. 2 is a schematic top view of the apparatus useful in the fabrication of the wide sheet ballistic materials described herein.

According to the process of the present invention, wide UHMWPE sheet is produced by a process that comprises calendering an array of overlapping or abutting strips of indeterminate length prepared as just described at a temperature below the melting point of the UHMWPE, generally in a range of between about 120° C. and about 155° C. (depending upon the tension applied to the strips during bonding as described below) at a pressure above about 300 pounds per lineal inch (pli) and under a tension of between about 0.3 grams/denier and about 5 grams/denier. The arrangement of the array and the resulting final product sheet is depicted in FIG. 7. The calendering apparatus used to accomplish the process is depicted in FIGS. 1-3.

Figure 5:
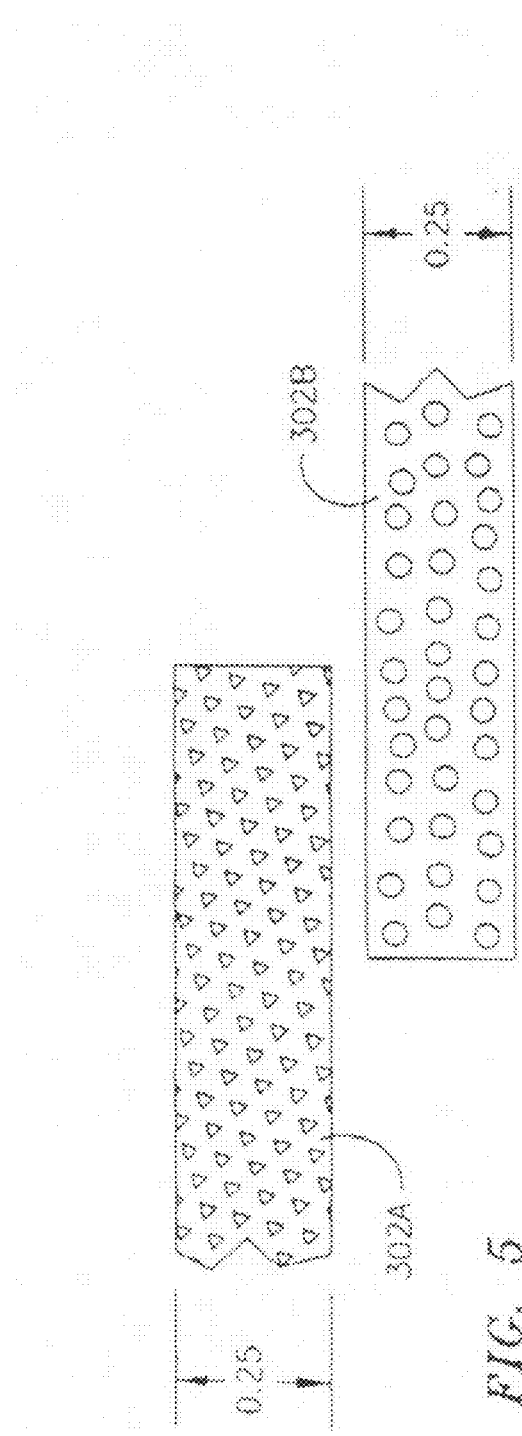
FIG. 5 is a cross-sectional view of the overlap area between two adjoining narrow strips of highly oriented UHMWPE prior to bonding in accordance with the practice of the present invention.
Figure 6:
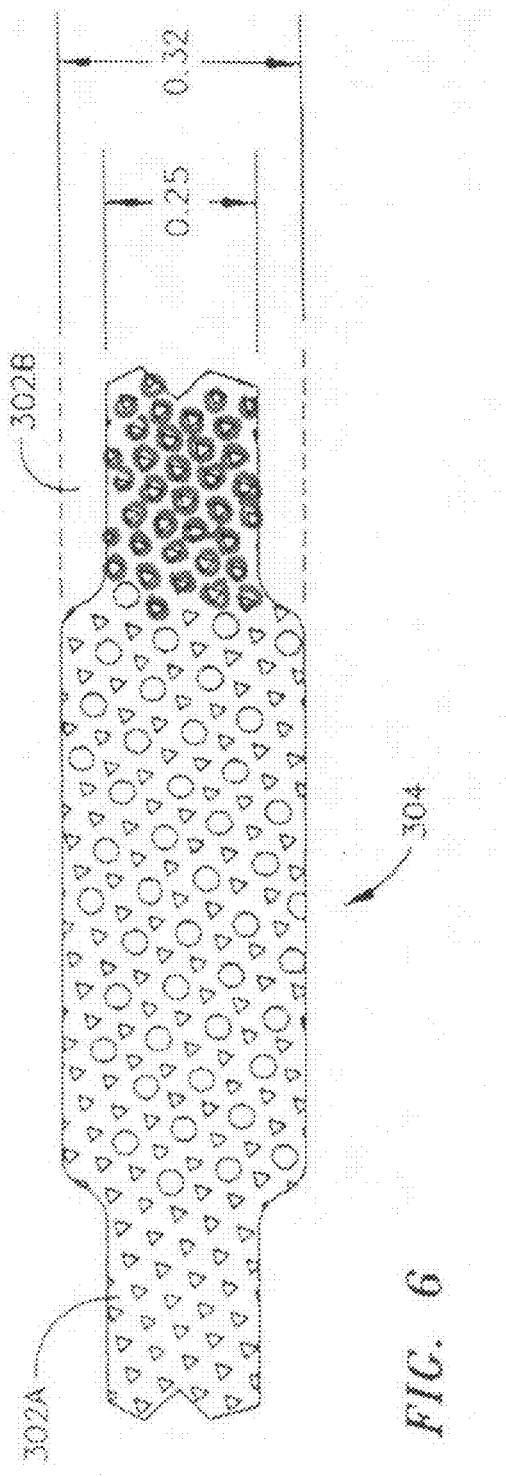
FIG. 6 is a cross-sectional representation of the joint volume between two highly oriented UHMWPE tapes after treatment in accordance with the method of the present invention.

Referring now to accompanying FIGS. 5-7, a first embodiment of the wide UHMWPE sheet of the present invention 300 comprises a series of parallel and overlapped tapes or strips 302 of indeterminate length. As used herein, in relation to this first preferred embodiment, the term "joint" is meant to define and refer to the overlapped areas/volumes 304 depicted n FIG. 6. As depicted in FIGS. 5, 6, 10 and 11, the molecules in two abutting or overlapping strips or tapes 302A and 302B are schematically depicted as triangles and circles to permit differentiation in the discussion that follows.

As depicted in FIGS. 5, 6 and 7, a first preferred embodiment of the wide sheet 300 of the present invention is produced by overlaying an array of tapes or strips 302A, 302B etc. of whatever width in parallel longitudinal relationship and then subjecting them to the processing conditions in the apparatus described herein. As shown in FIG. 5, in one embodiment of the present invention, each of overlaying strips or tapes 302A and 302B is 0.0025 inches in thickness and the molecules (schematically represented as triangles and circles) are in each of separate strips or tapes 302A and 302B. As shown in FIG. 6, once the overlapping structure has been subjected to the process conditions described herein, the total thickness of the joint 304 is about 0.0032 inches, a total reduction of more than about 35% and the molecules have been intermingled, in this case most probably entangled to provide a joint 304 that exhibits a higher strength than the parent material as well as a higher modulus. The thicknesses of strips or tapes 302A and 302B just mentioned are used for demonstration purposes only, it being clearly contemplated that thicker or thinner strips 302A and 320B could be equally well used to for the UHMWPE wide sheet described herein. More particularly, strips having thicknesses between about 0.0010 inches and 0.01 inches, for example, could be equally well used to form the wide sheet of the present invention assuming the availability of suitable calendering equipment. Strips in the range of between about 0.0015 and about 0.007 inches in thickness are specifically preferred for use in accordance with the present invention. It should be noted that such thickness reduction in joint area 304 and the intermingling of the molecules of each of the parent strips or tapes 302A and 302B can only be accomplished with the application of the pressures described herein. Subjection of the overlapping structure to lower pressures, as described in the prior art, does not achieve the thickness reduction and molecular commingling of the present invention or the strength and modulus increases resulting therefrom. The attainment of these enhancements and their presence clearly and unequivocally distinguish the process and products of the present invention from those of the prior art. These enhancements are demonstrated in the discussion that follows in connection with FIGS. 8 and 9.

Figure 8:
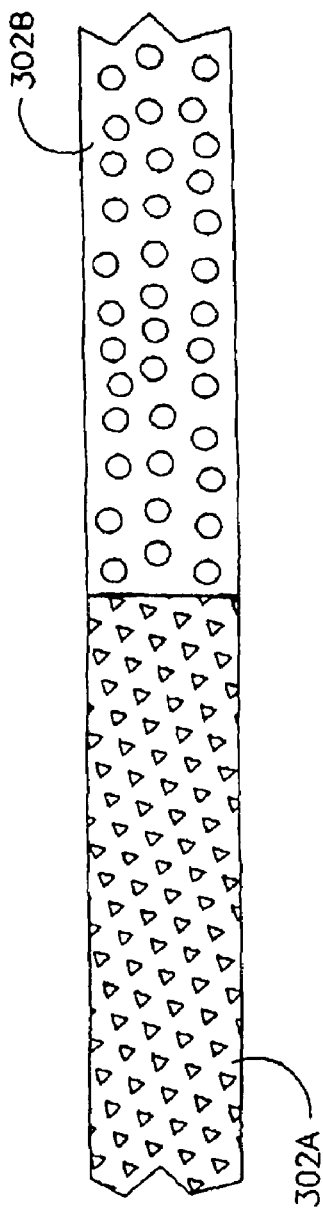
FIGS. 8 and 9 are cross-sectional views depicting an alternative preferred embodiment of the present invention.
Figure 9:
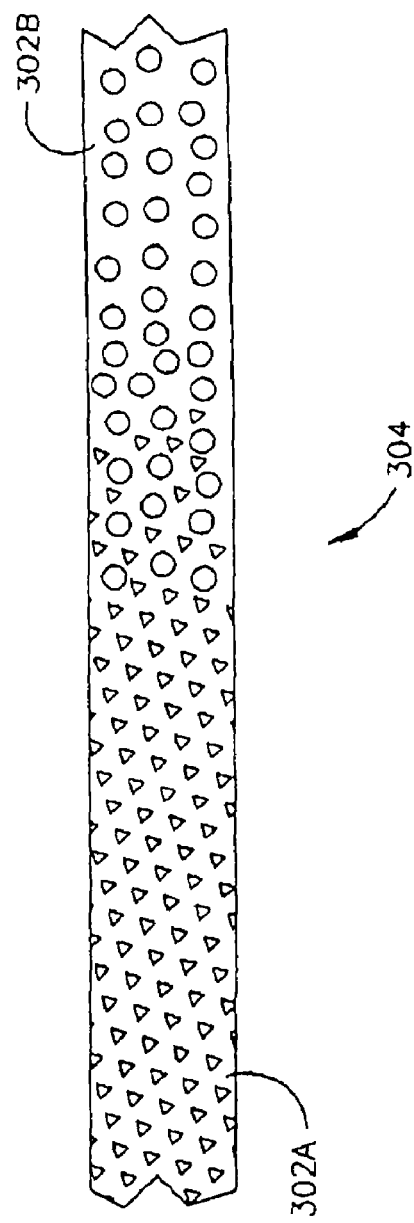

FIGS. 8 and 9 depict cross-sectional views representing an alternative preferred embodiment of the UHMWPE wide sheet of the present invention. As shown in FIG. 8, according to this embodiment, two strips 302A and 302B of UHMWPE are butted together. The processing of this butted configuration under the processing conditions described herein and in the apparatus described herein results in the structure shown in FIG. 9 wherein each of strips 302A and 302B has undergone a degree of "side extrusion", i.e. the longitudinal edges of each of the strips has been blended with the longitudinal edge of the abutting strip to form a joint area/volume 304 defined by the merger of the molecules of each of the member strips depicted as circles and triangles for differentiation purposes in these two Figures. This product wide sheet is fabricated by laying up an array of longitudinally abutting strips of UHMWPE and subjecting the array thus formed to the processing conditions described herein in an apparatus similar to that described above with the exception that instead of overlaying neighboring strips of UHMWPE the strips are butted against each other prior to processing. Under these conditions, the abutting strips undergo side extrusion forcing the neighboring edges into each other to provide the structure depicted in FIG. 9. As can be envisioned and as depicted in FIG. 11, this wide sheet comprises an essentially flat sheet with little or no thickness difference in joint area/volume 304.

Referring now to FIGS. 1-3, the apparatus utilized in accordance with the present invention to obtain the superior wide ballistic sheet of the present invention comprises seven discrete zones 10-70 as depicted in FIG. 1. Zone 10 is the feedstock payoff zone, zone 20 comprises a tension control zone that helps develop tension (other means are of course possible such as the inclusion of additional rollers), zone 30 is the initial and final alignment guide zone, zone 40 is a motor driven roll stand that imparts pulling energy to draw material through apparatus 1, zone 50 comprises the calender rolls that apply heat and pressure to bond the strips 01 of overlapped material, zone 60 comprises a motor driven roll stand that pulls the overlapped material from the calender and feeds it to the take up stand or zone 70.

Individual rolls of material 01 and 01' (shown as element 302 in FIGS. 5, 6 and 7) are mounted on shafts 12 and 12' to support them for unrolling and to place them in staggered relationship. The material on each of individual rolls 1 has an edge 3 and the edges 03 on staggered rolls 01 and 01' are oriented so as to overlap slightly as shown in the accompanying Figures. A resistance mechanism 14 is applied to rolls 1 to control their rate of unwinding.

As material 302 exits feedstock payoff zone 10 it is passed through a series of bars 20 (best seen in FIG. 1) that serve to control tension as material 302 is pulled through the line by subsequent operations. As will be explained more fully below, tension control is very important to the successful practice of the present invention.

Upon exiting zone 20 material 302 enters zone 30 which comprises two sets of offset rolls 31 and 31' that include flanges 32 and 32' mounted upon adjustable shafts 33 and 33' that serve to direct the flow of material 302 into subsequent zone 40 and control the amount of overlap of material 302 as it enters this subsequent zone.

Zone 40 comprises a series of vertically offset rolls 40 and 40' that pull material 302 from feedstock rolls 01 and through zones 20 and 30. A motor 42 is provided to drive rolls 41 and 41'.

Zone 50 comprises a final set of guide rolls 31 including flanges 32 mounted on a shaft 33 which serve to provide final guidance of overlapped material 302 into calender zone 50. The overlapped materials at this point in the process and in accordance with this embodiment are shown generally in FIG. 4. As shown in this Figure three input strips 1 of widths W1, W2 and W3 are overlapped a distance WT. WT may vary widely from a small fraction of an inch upwards to an inch or two. The amount of overlap is not particularly significant and does not materially affect the process or the product produced thereby. Within calender zone 50 are located calender rolls 51 and 51' that supply the requisite pressure to overlapped material 302 as specified elsewhere herein and exiting zone 50 is wide ballistic sheet 300 comprising overlapped and intimately bound sections of material 302 as shown in FIG. 5. As depicted in FIG. 3, a lift bar 55 driven by cylinder 54 is provided to lift top roll 51 to permit threading of overlapped material 302 between calender rolls 51 and 51'.

After exiting zone 50 wide ballistic sheet 300 enters zone 60 which comprises an offset set of pull rolls 61 which serve to draw material through apparatus 100 under tension as described elsewhere herein. A motor 62 is provided to drive rolls 60.

In zone 70 wide ballistic sheet 300 is taken up and rerolled onto a shaft 71 driven by motor 72.

Referring now to FIG. 4, it can be seen that as material 01 enters the various guide rolls described hereinabove and more specifically guide rolls 31 proximate calender rolls 51 and 51', each has a specific width W1, W2 or W3 which are preferably all the same but could be different, and overlap as shown in FIG. 4 and also shown in greater detail in FIG. 7.

The processing conditions described herein, temperatures below the melting point of the UHMWPE strips, tensions in the range of from about 0.3 and about 5 grams/denier and pressures above about 300 pli, define an operating window whose parameters of temperature and tension are intimately interrelated. As is well known in the art of producing UHMWPE, as tension on a fiber or strip of UHMWPE the "melting point" i.e. the temperature at which the onset of melt can be detected, increases as tension increases on a fiber or strip. Thus while at a tension of 0.3 grams/denier a temperature of about 120° C. may be below the melt point of the UHMWPE strips, at a tension of 5 grams/denier a temperature of 154° C. may still be just below the melt point of the UHMWPE strips. Thus, this interrelationship of tension and temperature must be carefully considered and maintained in order to obtain the enhanced products of the present invention. The pressure element of the processing conditions, is largely independent of the tension and temperature relationship just described. According to various preferred embodiments of the processing conditions of the present invention, temperatures in the range of from about 125° C. and 150° C. and tensions in the range of from about 0.4 and about 4.5 grams/denier are specifically preferred. The speed at which the process can be operated successfully is dependent solely upon the rate at which heat can be imparted to the UHMWPE strips. As long as the strips can be brought to the proper temperature prior to introduction into the calender rolls, the process will be effective. Such more rapid heating could be through the use of a preheating oven, the use of larger calender rolls, multiple sets of calender rolls, the use of multiple calenders, etc.

UHMWPE wide sheet produced in accordance with the process described herein exhibit a remarkable degree of transparency, in excess of 30%, while those of the prior art prepared as described below exhibited the opacity of the parent strip materials. This is undoubtedly due to either the fact that at low temperatures the process of the prior art does not produce well consolidated or intimately commingled structures, thus, exhibiting the transparency of the parent material, while at higher temperatures melting occurs, as discussed in greater detail below, leading to the presence of voids in the melted areas that serve to diffuse light and result in increased opacity.

In order to demonstrate clearly the distinctions between the products of the present invention and the far inferior products of the prior art, samples of wide UHMWPE fabricated in accordance with the present invention and in accordance with the process described in European Patent Publication No. EP 1 627 719 A1 were produced and subjected to SEM study to clearly observe the structural differences between the joint areas/volumes in each of the products. The results of these studies are discussed below.

SEM (scanning electron microscope) images made across a joint in each of the products in the direction shown by arrow A-A in FIG. 7, i.e. transverse to the length of joint area/volume of a joint made in accordance with the processing parameters described in the aforementioned European Patent Publication No. EP 1 627 719 A1, (processing conditions used to fabricate this sample were specifically a temperature of 110° C. and a laminating pressure of 145 psi) clearly shows a distinct "joint line", i.e. a point in the joint area/volume where the materials have not been intimately blended. This joint line serves as an indication that intimate blending of the material from the two strips that form the joint was not obtained. Testing of this joint showed that it peeled apart easily and retained virtually no structural integrity when subjected to separating forces.

An SEM photograph of a sample of wide UHMWPE sheet fabricated in accordance with the present invention shows that there is no "joint line" and the point at which the materials from the overlapping sheets meets is indistinguishable from the parent materials. This joint was virtually impossible to separate and at this time appears to exhibit strength and modulus properties superior to those of the parent strip material.

In further evaluation of the teachings of the prior art, samples were prepared according to the teachings of the reference at temperatures of 140° C. and 150° C. and pressures of 145 psi and 14.5 psi respectively. A study of photomicrographs of these joints shows that there is no joint line in these samples, however, in these instances, the absence of a distinct joint line is due to melting of the UHMWPE strips in the joint area as shown by the residual striations or voids apparent in the photomicrographs. It is well known that the UHMWPE materials utilized in the prior art exhibit what is characterized as the "onset of melt" (these materials do not exhibit a clear and distinct melting point) in the range of about 140° C. Thus, in spite of the continued teachings of the prior art that lamination should occur below the melting point of the UHMWPE material, the process only produces an integrated structure when practiced above the melting point of the parent material. Melting of the UHMWPE in a sense "anneals" the material thereby significantly reducing its modulus and strength as compared to an "unannealed" bonded material.

In order to make the comparison of the processing conditions of the present invention and those of the prior art more direct, it has been calculated that the pressures utilized in the present invention are above about 17,000 psi and about 85,000 psi at the upper end of the described useful pressures. These pressures are considerably higher than the 14.5-145 psi pressures indicated as useful in the prior art European Patent Publication. Stated more comparatively the pressures used in the present process are generally in excess of about 2000 N/cm² as opposed to the 10-100 N/cm² taught by the prior art. Thus, the process of the present invention produces an UHMWPE wide sheet that is considerably different than that produced by the prior art process.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for the production of a wide polymeric sheet comprising:

A) placing a series of elongated strips of ultra high molecular weight polyethylene in overlapping or abutting longitudinal relationship to form an array of polymeric strips;

B) applying tension to the array of polymeric strips; and

C) calendering the array of polymeric strips at a temperature below the melting point of the polyethylene thereby creating a sheet including joint areas having an intermingling of molecules between said overlapped or abutted strips.

2. The method of claim 1 wherein said tension applied to the array of strips is between 0.3 grams/denier and 5 grams/denier and calendering is performed at a temperature of between 120° C. and 155° C. and at a pressure above 300 pounds per linear inch.

3. The method of claim 2 wherein the tension is between 0.4 grams/denier and 4.5 grams/denier and the temperature is between 125° C. and 150° C.

* * * * *